United States Patent
Pfeuffer et al.

(10) Patent No.: US 9,315,717 B2
(45) Date of Patent: *Apr. 19, 2016

(54) WATER-SOLUBLE, HYDROPHOBIC ASSOCIATING COPOLYMERS

(75) Inventors: Thomas Pfeuffer, Hassfurt (DE); Roland Reichenbach-Klinke, Traunstein (DE); Stefan Friedrich, Garching (DE); Marcus Guzmann, Münsing (DE)

(73) Assignee: BASF SE, Ludwigshafen (DE)

( * ) Notice: Subject to any disclaimer, the term of this patent is extended or adjusted under 35 U.S.C. 154(b) by 1030 days.

This patent is subject to a terminal disclaimer.

(21) Appl. No.: 13/378,684

(22) PCT Filed: Jul. 30, 2010

(86) PCT No.: PCT/EP2010/061074
§ 371 (c)(1),
(2), (4) Date: Jan. 12, 2012

(87) PCT Pub. No.: WO2011/015520
PCT Pub. Date: Feb. 10, 2011

(65) Prior Publication Data
US 2012/0129739 A1 May 24, 2012

(30) Foreign Application Priority Data
Aug. 6, 2009 (EP) .................................. 09167328

(51) Int. Cl.
| | | |
|---|---|---|
| *C09K 8/588* | (2006.01) | |
| *C08F 2/48* | (2006.01) | |
| *C08L 29/10* | (2006.01) | |
| *C09K 8/584* | (2006.01) | |
| *C08F 220/56* | (2006.01) | |
| *C08F 220/58* | (2006.01) | |
| *C08F 220/34* | (2006.01) | |
| *C08F 222/10* | (2006.01) | |

(52) U.S. Cl.
CPC ............. *C09K 8/584* (2013.01); *C08F 220/56* (2013.01); *C08F 220/58* (2013.01); *C09K 8/588* (2013.01); *C08F 220/34* (2013.01); *C08F 222/1006* (2013.01)

(58) Field of Classification Search
None
See application file for complete search history.

(56) References Cited

U.S. PATENT DOCUMENTS

| | | | | |
|---|---|---|---|---|
| 4,921,902 A | * | 5/1990 | Evani et al. ................... | 524/555 |
| 6,169,058 B1 | * | 1/2001 | Le et al. ........................ | 507/222 |
| 8,124,670 B2 | | 2/2012 | Matzinger et al. | |
| 8,752,624 B2 | * | 6/2014 | Reichenbach-Klinke | C09K 8/584 |
| | | | | 166/270.1 |
| 2003/0022987 A1 | * | 1/2003 | Matz et al. ..................... | 524/814 |
| 2008/0194434 A1 | * | 8/2008 | Huff et al. ..................... | 507/221 |

FOREIGN PATENT DOCUMENTS

| | | |
|---|---|---|
| CA | 2196908 | 12/1944 |
| CA | 2660589 | 2/2008 |
| DE | 100 37 629 A1 | 2/2002 |
| DE | 10 2004 032 304 A1 | 2/2006 |
| EP | 705 854 A1 | 4/1996 |
| WO | WO 85/03510 A1 | 8/1985 |
| WO | WO 2006 002 936 A1 | 1/2006 |

OTHER PUBLICATIONS

Ye, et al., Study of P(AM-NVP-DMDA) Hydrophobicaliy Associating Water-Soluble Terpolymer, Journal of Applied Polymer Science, vol. 74—pp. 211-217 (1999).

Kujawa, et al., Micellar Synthesis and Properties of Hydrophobically associating Polyampholytes Macromol, Chem. Phys. 2001, 202, pp. 1384-1397.

Taylor, et al., Water-soluble hydrophobically associating polymers for improved oil recovery: A literature review, Journal of Petroleum Science & Engineering 1988, pp. 265-280.

Zhu, et al. Hydrophically modified associating polyacrylamine (HAPAM) synthesized by micellar copolymeriation at high monomer concentration, European Polymer Journal (2007), pp. 824-834.

Volbert, et al., Associating behavior of polyacrylamides hydrophobically modified woth dihexylacrylamide, Polymers, vol. 39, (Rev. 4/1997) pp. 1025-1033.

* cited by examiner

*Primary Examiner* — John J Figueroa
(74) *Attorney, Agent, or Firm* — Norton Rose Fulbright US LLP

(57) ABSTRACT

Water-soluble, hydrophobically associating copolymer comprising a monoethylenically unsaturated, water-soluble, surface-active monomer (a), and a monoethylenically unsaturated, hydrophilic monomer (b) different from monomer (a). The copolymer is prepared in the presence of a nonpolymerizable surfactant and has marked thickening properties in aqueous systems.

25 Claims, No Drawings

WATER-SOLUBLE, HYDROPHOBIC ASSOCIATING COPOLYMERS

This application is a §371 of PCT/EP2010/061.074 filed Jul. 30, 2010. This application also claims priority from EP 09167328.5 filed Aug. 6, 2009.

The present invention relates to a water-soluble, hydrophobically associating copolymer which is obtained in the presence of a nonpolymerizable surface-active compound, to processes for its preparation and to its use.

Water-soluble and polymers with thickening properties are used in many areas of technology, for example in the cosmetics field, in foods, for the manufacture of cleaners, printing inks, emulsion paints, but in particular also in the recovery of mineral oil.

Many chemically different classes of polymers are known which can be used as thickeners. An important class of thickening polymers is the so-called hydrophobically associating polymers. This is understood by the person skilled in the art as meaning water-soluble polymers which have lateral or terminal hydrophobic groups, such as, for example, relatively long alkyl chains. In aqueous solution, hydrophobic groups of this type can associate with themselves or with other substances having hydrophobic groups. As a result of this, an associative network is formed through which the medium is thickened.

One important field of use of these hydrophobically associating copolymers is in the field of mineral oil recovery, in particular for enhanced oil recovery (EOR). Details on using hydrophobically associating copolymers for enhanced oil recovery are described, for example, in the overview article by Taylor, K. C. and Nasr-El-Din, H. A. in J. Petr. Sci. Eng. 1998, 19, 265-280.

The techniques of enhanced oil recovery include "polymer flooding". A mineral oil deposit is not a subterranean "sea of mineral oil", but the mineral oil is held in the tiny pores of the mineral oil-conveying rock. The diameter of the cavities in the formation is usually only a few micrometers. For the polymer flooding, an aqueous solution of a thickening polymer is injected into a mineral oil deposit through injection wells. By injecting in the polymer solution, the mineral oil is forced through said cavities in the formation starting from the injection well in the direction of the production well, and the mineral oil is recovered via the production well.

The use of an aqueous polymer solution in comparison to pure water avoids, that upon the flooding of subterranean formations no channels of varying permeability are formed ("fingering"), as a result of which the other subterranean areas would not become flooded. The addition of the polymer to the polymer to the aqueous phase reduces its mobility and causes a more steady flooding. Moreover, it must be ensured that the aqueous polymer solution does not comprise any kind of gel particles. This is because even small gel particles with dimensions in the micrometer range can block the fine pores in the formation and thus bring the mineral oil recovery to a standstill. Hydrophobically associating copolymers for enhanced oil recovery should therefore have the lowest possible fraction of gel particles. The object therefore consists in achieving, through the polymers, an increase in the viscosity of the water, which ideally corresponds to the viscosity of the hydrocarbons to be recovered.

Hydrophobically associating, water-soluble copolymers are often prepared by the so-called micellar copolymerization. In this process, water-insoluble comonomers are solvated through the addition of surfactants in the aqueous reaction medium and are reacted with hydrophilic comonomers such as, for example, acrylamide, to give a water-soluble, hydrophobically associating copolymer. Thus, for example Macromol. Chem. Phys. 2001, 202, 1384-1397 describes the micellar copolymerization of the water-soluble comonomers acrylamide, AMPS (acrylamidomethylpropanesulphonic acid) and MADQUAT ([2-(methacryloyloxy)ethyl]trimethylammonium chloride) with dihexylacrylamide or N-(4-ethylphenyl)acrylamide, while Polymer 1998, 39 (5), 1025-1033 discusses the copolymerization of acrylamide with dihexylacrylamide and Eur. Polym. J. 2007, 43, 824-834 discusses the copolymerization of acrylamide with N-octadecylacrylamide. In both cases, the surfactant used is sodium dodecylsulphonate (SDS). A further example of a micellar copolymerization is given in J. Colloid Interf. Sci. 2009, 333, 152-163. Here, acrylamide is reacted with a polypropylene glycol methacrylate in the presence of SDS.

Moreover, WO 85/03510 discloses water-soluble, hydrophobically associating copolymers of an ethylenic unsaturated water-soluble monomer and an ethylenic unsaturated amphiphilic monomer with hydrophobic groups. Such copolymers can be synthesised by reacting water-soluble monomers, such as acrylamide and amphiphilic monomers such as dodecyl-polyoxylene (10)-methacrylate. These amphiphilic comonomers are characterized as water-soluble at ambient temperatures, but water-insoluble at higher temperatures such as 60° as used during the synthesis of the copolymers. In consequence, a surface active agent or an emulsing agent are added if necessary, for example than the polymerisation is conducted at higher temperatures. The addition of the surface active agent or the emulsing agent insures the solubility of the amphiphilic comonomers under the conditions of the polymerization process. However, the monomer than is no longer water-soluble.

A further method for the preparation of water-soluble, hydrophobically associating copolymers is the use of surface-active, water-soluble comonomers. These comonomers have a hydrophobic fraction, which brings about the hydrophobically associating effect in the copolymer, and a hydrophilic fraction, which ensures the solubility of the comonomer in water. One advantage of this process is that no additional surfactant is required for solvating the hydrophobically associating monomer.

Examples of the application of this process can be found in EP 705 854 A1, DE 100 37 629 A1 and DE 10 2004 032 304 A1. These specifications disclose water-soluble, hydrophobically associating copolymers and their use, for example in the field of construction chemistry. As hydrophobically associating monomers, the disclosed copolymers in each case comprise monomers of the following type: $H_2C=C(R^x)—COO—(—CH_2—CH_2—O—)_q—R^y$ or $H_2C=C(R^x)—O—(—CH_2—CH_2—O—)_q—R^y$ where $R^x$ is typically H or $CH_3$ and $R^y$ is a relatively large hydrocarbon radical, typically hydrocarbon radicals having 8 to 40 carbon atoms. For example, relatively long alkyl groups or a tristyryiphenyl group are mentioned in the specifications.

Furthermore, J. Appl. Polym. Sci. 1999, 74, 211-217 discusses the use of a cationic, water-soluble, hydrophobically associating comonomer which has been obtained by reacting 2-methacryloyloxyethyldimethylamine with 1-bromododecane.

The Canadian patent specification 2,196,908 deals with associating monomers and polymers. At the fore in this document are essentially emulsion polymers of methacrylic acid, ethyl acrylate and a monomer which has been obtained by reacting dimethyl-m-isoprenyl benzyl isocyanate (DMI) and IEM or polybutylene oxide or polybutylene oxide-co-polyethylene oxide. Here, primarily non-water-soluble and non-hydrophilic monomers, such as, for example, ethyl acrylate, are used.

A disadvantage of all of the hitherto described and commercially available hydrophobically associative polymers is their still very high gel fraction which is formed during the dissolution and can block porous formations, as a result of which uniform polymer flooding would be appreciably disrupted. This problem has already been partly solved using copolymers as per the as yet unpublished European patent application EP 09 160 799.4: although the gel fractions could be markedly reduced therein, they could not be avoided entirely.

It was therefore an object of the present invention to provide hydrophobically associating copolymers with low or undetectable gel fractions. Moreover, the copolymers should be able to be prepared more cost-effectively than hitherto and their effect as thickeners should be at least equal to the compounds to date.

This object was achieved with a water-soluble, hydrophobically associating copolymer comprising:
  (a) at least one monoethylenically unsaturated, water-soluble, surface-active monomer (a), and
  (b) at least one monoethylenically unsaturated, hydrophilic monomer (b) different from monomer (a).

This copolymer is characterized in a manner essential to the invention in that during its synthesis, prior to the initiation of the polymerization reaction, at least one further, but non-polymerizable surface-active compound is added as further component (c).

As already mentioned above, one advantage of the processes known from the prior art is considered to be that the hydrophobically associating copolymers can be prepared without the addition of a surfactant since all of the comonomers used are water-soluble.

It was therefore all the more surprising that in the case of the copolymers according to the invention, through the addition of a surfactant during the aqueous solution polymerization of hydrophilic monomers with a water-soluble, hydrophobically associating comonomer, a significant improvement in the polymer properties, in particular the thickening effect, could be achieved and, moreover, the gel fraction could be significantly reduced as per the objective.

This effect can presumably be explained as follows:

During the known procedure, the surface-active, hydrophobically associating comonomer forms micelles in the aqueous reaction medium. During the polymerization, this leads to the hydrophobically associating regions being incorporated blockwise into the polymer. If then, according to the invention, an additional surface-active compound is present during the preparation of the copolymers, mixed micelles are formed. These mixed micelles comprise polymerizable and nonpolymerizable fractions. Consequently, the hydrophobically associating monomers are then incorporated in relatively short blocks. At the same time, the number of these shorter blocks per polymer chain is greater.

Consequently, the polymer constitution of the copolymers according to the invention differs significantly from the copolymers according to the prior art as a result of which their application properties also significantly improve.

The hydrophobically associating copolymers according to the invention are water-soluble copolymers which have hydrophobic groups. In aqueous solution, the hydrophobic groups can associate with themselves or with other substances having hydrophobic groups, and thicken the aqueous medium as a result of this interaction.

It is known to the person skilled in the art that the solubility of hydrophobically associating (co)polymers in water can be dependent to a greater or lesser extent on the pH depending on the type of monomers used. A reference point for assessing the solubility in water should therefore in each case be the pH desired for the particular intended use of the copolymer. A copolymer which does not have an adequate solubility for the intended use at one particular pH may have an adequate solubility at another pH. The term "water-soluble" includes in particular also alkali-soluble dispersions of polymers, i.e. polymers which are present in the acidic pH range as dispersions and only in the alkaline pH range dissolve in water and develop their thickening effect.

In the ideal case, the copolymers according to the invention should be miscible with water in any desired ratio. According to the invention, however, it is sufficient if the copolymers are water-soluble at least at the desired use concentration and at the desired pH. As a rule, the solubility in water at room temperature should be at least 20 g/l, preferably at least 50 g/l and particularly preferably at least 100 g/l.

Besides the hydrophobic groups already mentioned, the hydrophobically associating copolymers according to the invention therefore comprise hydrophilic groups in an amount such that the described solubility in water is ensured at least in the pH ranges envisaged for the particular application.

Monomer (a)

The hydrophobically associating copolymer according to the invention comprises at least one monoethylenically unsaturated, water-soluble monomer (a) which imparts hydrophobically associating properties to the copolymer according to the invention and is therefore referred to below as hydrophobically associating monomer.

According to the invention, at least one of the monoethylenically unsaturated water-soluble monomers (a) is preferably a monomer of the general formulae (I), (II) and/or (III)

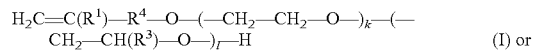   (I) or

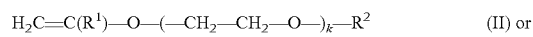   (II) or

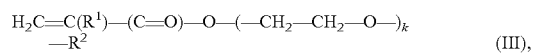   (III), where the units $-(-CH_2-CH_2-O-)_k$ and $-(-CH_2-CH(R^3)-O-)_l$ are arranged in block structure in the order shown in formula (I) and the radicals and indices have the following meaning:

k: a number from 6 to 150,
l: a number from 5 to 25,
$R^1$: H or methyl,
$R^2$: an aliphatic and/or aromatic, straight-chain or branched hydrocarbon radical having 8 to 40 carbon atoms,
$R^3$: independently of one another, a hydrocarbon radical having at least 2 carbon atoms,
$R^4$: a single bond or a divalent linking group selected from the group of $-(C_nH_{2n})-[R^{4a}]$, $-O-(C_{n'}H_{2n'})-[R^{4b}]$ and $-C(O)-O-(C_{n''}H_{2n''})-[R^{4c}]$, where n, n' and n" is in each case a natural number from 1 to 6.

In the monomers (a) of the formula (I), an ethylenic group $H_2C=C(R^1)-$ is bonded via a divalent, linking group $-R^4-O-$ to a polyoxyalkylene radical with block structure $-(-CH_2-CH_2-O-)_k-(-CH_2-CH(R^3)-O-)_l-H$, where the two blocks $-(-CH_2-CH_2-O-)_k$ and $-(-CH_2-CH(R^3)-O-)_l$ are arranged in the order shown in formula (I). The polyoxyalkylene radical has a terminal OH group.

In the aforementioned formula, $R^1$ is H or a methyl group. $R^4$ is a single bond or a divalent linking group selected from the group of $-(C_nH_{2n})-[R^{4a}]$, $-O-(C_{n'}H_{2n'})-[R^{4b}]$ and $-C(O)-O-(C_{n''}H_{2n''})-[R^{4c}]$. In the specified formulae, n, n' and n" are in each case a natural number from 1 to 6. In other words, the linking group is straight-chain or branched aliphatic hydrocarbon groups having 1 to 6 carbon atoms which are linked to the ethylenic group $H_2C=C(R^1)$— either directly, via an ether group —O— or via an ester group —C(O)—O—. The groups —($C_nH_{2n}$)—, —($C_{n'}H_{2n'}$)— and —($C_{n''}H_{2n''}$)— are preferably linear aliphatic hydrocarbon groups. $R^3$ is preferably a hydrocarbon radical having at least 3 carbon atoms.

Preferably, $R^1$ is H and $R^4$ is a group selected from —$CH_2$— or —O—$CH_2$—$CH_2$—$CH_2$—$CH_2$—.

Preferably, $R^{4a}$ is a group selected from —$CH_2$—, —$CH_2$—$CH_2$— and —$CH_2$—$CH_2$—$CH_2$—, and is particularly preferably a methylene group —$CH_2$—.

Preferably, $R^{4b}$ is a group selected from —O—$CH_2$—$CH_2$—, —O—$CH_2$—$CH_2$—$CH_2$— and —O—$CH_2$—$CH_2$—$CH_2$—$CH_2$—, and is particularly preferably —O—$CH_2$—$CH_2$—$CH_2$—$CH_2$—.

Preferably, $R^{4c}$ is a group selected from —C(O)—O—$CH_2$—$CH_2$—, —C(O)O—CH($CH_3$)—$CH_2$—, —C(O)O—$CH_2$—CH($CH_3$)—, —C(O)O—$CH_2$—$CH_2$—$CH_2$—$CH_2$— and —C(O)O—$CH_2$—$CH_2$—$CH_2$—$CH_2$—$CH_2$—$CH_2$—, particular preference being given to —C(O)—O—$CH_2$—$CH_2$— and —C(O)O—$CH_2$—$CH_2$—$CH_2$—$CH_2$— and very particular preference being given to —C(O)—O—$CH_2$—$CH_2$—.

The group $R^4$ is particularly preferably a group $R^{4a}$ or $R^{4b}$, particularly preferably a group $R^{4b}$.

Furthermore, $R^4$ is particularly preferably a group selected from —$CH_2$— or —O—$CH_2$—$CH_2$—$CH_2$—$CH_2$—, and is very particularly preferably —O—$CH_2$—$CH_2$—$CH_2$—$CH_2$—.

Furthermore, the monomers (I) have a polyoxyalkylene radical which consists of the units —(—$CH_2$—$CH_2$—O—)$_k$ and —(—$CH_2$—CH($R^3$)—O—)$_l$, where the units are arranged in block structure in the order shown in formula (I). The transition between the two blocks may be abrupt or continuous.

The number of alkylene oxide units k is a number from 6 to 150, preferably 12 to 100, particularly preferably 15 to 80, very particularly preferably 20 to 30 and for example ca. 22 to 25. For the person skilled in the art in the field of polyalkylene oxides, it is clear that the specified numbers are average values of distributions.

In the second, terminal block —(—$CH_2$—CH($R^3$)—O—)$_l$, the radicals $R^3$, independently of one another, are hydrocarbon radicals of at least 2 carbon atoms, preferably at least 3 and particularly preferably 3 to 10 carbon atoms. These may be an aliphatic and/or aromatic, linear or branched hydrocarbon radical. These are preferably aliphatic radicals.

Examples of suitable radicals $R^3$ include ethyl, n-propyl, n-butyl, n-pentyl, n-hexyl, n-heptyl, n-octyl, n-nonyl or n-decyl and phenyl. Examples of preferred radicals include n-propyl, n-butyl, n-pentyl and particular preference is given to an n-propyl radical.

The block —(—$CH_2$—CH($R^3$)—O—)$_l$— is thus a block which consists of alkylene oxide units having at least 4 carbon atoms, preferably at least 5 carbon atoms, and/or glycidyl ethers with an ether group of at least 2, preferably at least 3, carbon atoms. Preferably, the radicals $R^3$ are the specified hydrocarbon radicals; the building blocks of the second terminal block are particularly preferably alkylene oxide units comprising at least 5 carbon atoms, such as pentene oxide units or units of higher alkylene oxides.

The number of alkylene oxide units l is a number from 5 to 25, preferably 6 to 20, particularly preferably 8 to 18, very particularly preferably 10 to 15 and, for example, ca. 12.

In the monomers of the formula (I), a terminal, monoethylenic group is thus linked to a polyoxyalkylene group with block structure, and specifically firstly to a hydrophilic block having polyethylene oxide units, and this in turn to a second terminal hydrophobic block which is composed at least of butene oxide units, preferably at least pentene oxide units or units of higher alkylene oxides, such as, for example, dodecene oxide. The second block has a terminal OH group. Thus, in contrast to the hydrophobically associating monomers (a) according to formula (II) and (III), the end group is not etherified with a hydrocarbon radical for the hydrophobic association, but the terminal block —(—$CH_2$—CH($R^3$)—O—)$_l$ itself with the radicals $R^3$ is responsible for the hydrophobic association of the copolymers prepared using the monomers (a).

The monomers (a) according to formula (II) are preferably compounds of the general formula $H_2C=CH$—O—(—$CH_2$—$CH_2$—O—)$_k$—$R^2$, where k is a number between 10 and 40 and $R^2$ is a tristyrylphenyl radical.

In the monomers (a) according to formula (III), $R^1$ is preferably methyl, k is a number between 6 and 30 and $R^2$ is a C12-alkyl radical or a tristyrylphenyl radical.

The three monomer representatives (I), (II) and (III) can be involved in the synthesis of the copolymer in any desired fractions.

For the person skilled in the art in the field of polyalkylene oxide block copolymers, it is clear that the transition between the two blocks can be abrupt or continuous depending on the type of preparation. In the case of a continuous transition, between the two blocks there is also a transition zone which comprises monomers of the two blocks. If the block limit is fixed in the middle of the transition zone, correspondingly the first block —(—$CH_2$—$CH_2$O—)$_k$ can still have small amounts of units —$CH_2$—CH($R^3$)—O—, and the second block —(—$CH_2$—CH($R^3$)—O—)$_l$— can have small amounts of units —$CH_2$—$CH_2$—O—, although these units are not distributed randomly over the block, but are arranged in said transition zone.

According to the invention, the monomers (a) are water-soluble. As a rule, the solubility of the monomers (a) in water at room temperature should be at least 10 g/l, preferably at least 50 g/l and particularly preferably at least 100 g/l.

The amount of monoethylenically unsaturated, hydrophobically associating monomers (a) is governed by the particular intended use of the copolymer according to the invention and is generally 0.1 to 20% by weight, based on the total amount of all of the monomers in the copolymer. Preferably, the amount is 0.5 to 15% by weight.

Hydrophilic Monomers (b)

Besides the monomers (a), the hydrophobically associating copolymer according to the invention comprises at least one monoethylenically unsaturated, hydrophilic monomer (b) different therefrom. It is of course also possible to use mixtures of two or more different hydrophilic monomers (b).

Besides an ethylenically unsaturated group, the hydrophilic monomers (b) comprise one or more hydrophilic groups. The hydrophilic groups are in particular functional groups which comprise O and/or N atoms. They can, moreover, comprise in particular S and/or P atoms as heteroatoms.

The monomers (b) are particularly preferably miscible with water in any desired ratio, although it suffices for carrying out the invention that the hydrophobically associating copolymer according to the invention has the solubility in water mentioned at the start. Generally, the solubility of the monomers (b) in water at room temperature should be at least 100 g/l, preferably at least 200 g/l and particularly preferably at least 500 g/l.

Examples of suitable functional groups include carbonyl groups >C=O, ether groups —O—, in particular polyethylene oxide groups —($CH_2$—$CH_2$—O—)$_n$—, where n is preferably a number from 1 to 200, hydroxy groups —OH, ester groups —C(O)O—, primary, secondary or tertiary amino groups, ammonium groups, amide groups —C(O)—NH—, carboxamide groups —C(O)—$NH_2$ or acidic groups such as carboxyl groups —COOH, sulphonic acid groups —$SO_3H$, phosphonic acid groups —$PO_3H_2$ or phosphoric acid groups —OP(OH)$_3$.

Examples of preferred functional groups include hydroxy groups —OH, carboxyl groups —COOH, sulphonic acid groups —$SO_3H$, carboxamide groups —C(O)—$NH_2$, amide groups —C(O)—NH—, and polyethylene oxide groups —($CH_2$—$CH_2$—O—)$_n$—H, where n is preferably a number from 1 to 200.

The functional groups can be attached directly to the ethylenic group, or else be bonded to the ethylenic group via one or more linking hydrocarbon groups.

The hydrophilic monomers (b) are preferably a monomer comprising acidic groups, where the acidic groups according to the invention are at least one group selected from the group of —COOH, —$SO_3H$ and —$PO_3H_2$. Preference is also given to monomers of the general formula $H_2C$=C($R^7$)$R^8$, where $R^7$ is H or methyl and $R^8$ is a hydrophilic group or a group comprising one or more hydrophilic groups.

The groups $R^8$ are groups which comprise heteroatoms in an amount such that the solubility in water defined at the start is achieved.

Examples of suitable monomers (b) include monomers comprising acidic groups, for example monomers comprising —COOH groups, such as acrylic acid or methacrylic acid, crotonic acid, itaconic acid, maleic acid or fumaric acid, monomers comprising sulphonic acid groups, such as vinylsulphonic acid, allylsulphonic acid, 3-allyloxy-2-hydroxypropanesulphonic acid, 2-acrylamido-2-methylpropanesulphonic acid (AMPS), 2-methacrylamido-2-methylpropanesulphonic acid, 2-acrylamidobutanesulphonic acid, 3-acrylamido-3-methylbutanesulphonic acid or 2-acrylamido-2,4,4-trimethylpentanesulphonic acid, or monomers comprising phosphonic acid groups, such as vinylphosphonic acid, allylphosphonic acid, N-(meth)acrylamidoalkylphosphonic acids or (meth)acryloyloxyalkylphosphonic acids.

Also to be mentioned are acrylamide and methacrylamide and also derivatives thereof, such as, for example, N-methyl(meth)acrylamide, N,N'-dimethyl(meth)acrylamide and N-methylolacrylamide, N-vinyl derivatives, such as N-vinylformamide, N-vinylacetamide, N-vinylpyrrolidone or N-vinylcaprolactam, and vinyl esters, such as vinyl formate or vinyl acetate. N-Vinyl derivatives can be hydrolysed after polymerization to vinylamine units, vinyl esters to vinyl alcohol units.

Further examples include monomers comprising hydroxy groups and/or ether groups, such as, for example, hydroxyethyl (meth)acrylate, hydroxypropyl (meth)acrylate, allyl alcohol, hydroxyvinyl ethyl ether, hydroxyvinyl propyl ether, hydroxyvinyl butyl ether or compounds of the formula $H_2C$=C($R^1$)—COO—(—$CH_2$—CH($R^9$)—O—)$_b$—$R^{10}$ (IVa) or $H_2C$=C($R^1$)—O—(—$CH_2$—CH($R^9$)—O—)$_b$—$R^{10}$ (IVb), where $R^1$ is as defined above and b is a number from 2 to 200, preferably 2 to 100. The radicals $R^9$ are, independently of one another, H, methyl or ethyl, preferably H or methyl, with the proviso that at least 50 mol % of the radicals $R^9$ are H. Preferably, at least 75 mol % of the radicals $R^9$ are H, particularly preferably at least 90 mol % and very particularly preferably exclusively H. The radical $R^{10}$ is H, methyl or ethyl, preferably H or methyl. The individual alkylene oxide units can be arranged randomly or blockwise. In the case of a block copolymer, the transition between the blocks may be abrupt or gradual.

Suitable hydrophilic monomers (b) are also monomers having ammonium groups, in particular ammonium derivatives of N-(ω-aminoalkyl)(meth)acrylamides or ω-aminoalkyl(meth)acrylic esters.

In particular, monomers (b) having ammonium groups may be compounds of the general formulae $H_2C$=C($R^7$)—CO—$NR^{13}$—$R^{11}$—$NR^{12}{}_3{}^+X^-$ (Va) and/or $H_2C$=C($R^7$)—COO—$R^{11}$—$NR^{12}{}_3{}^+X^-$ (Vb), where $R^7$ has the meaning given above, thus is H or methyl, $R^{11}$ is a preferably linear $C_1$-$C_4$-alkylene group and $R^{13}$ is H or a $C_1$-$C_4$-alkyl group, preferably H or methyl. The radicals $R^{12}$, independently of one another, are $C_1$-$C_4$-alkyl, preferably methyl or a group of the general formula —$R^{14}$—$SO_3H$, where $R^{14}$ is a preferably linear $C_1$-$C_4$-alkylene group or a phenyl group, with the proviso that generally not more than one of the substituents $R^{12}$ is a substituent having sulphonic acid groups. The three substituents $R^{12}$ are particularly preferably methyl groups, i.e. the monomer has a group —N($CH_3$)$_3^+$. $X^-$ in the above formula is a monovalent anion, for example $Cl^-$. $X^-$ can of course also be a corresponding fraction of a polyvalent anion, although this is not preferred. Examples of suitable monomers (b) of the general formula (Va) or (Vb) include salts of 3-trimethylammonium propylacrylamides or 2-trimethylammonium ethyl (meth)acrylates, for example the corresponding chlorides, such as 3-trimethylammonium propylacrylamide chloride (DIMAPAQUAT) and 2-trimethylammonium ethyl methacrylate chloride (MADAME-QUAT).

The monomer (b) can thus also be a neutral monomer (b1) and here in particular a monomer selected from the group of (meth)acrylamide, N-methyl(meth)acrylamide, N,N-dimethyl(meth)acrylamide, N-methylol(meth)acrylamide, N-vinylformamide or N-vinyl-2-pyrrolidone, and the monomer (b2) is at least one selected from the group of (meth)acrylic acid, vinylsulphonic acid, allylsulphonic acid, 2-acrylamido-2-methylpropanesulphonic acid (AMPS), 2-methacrylamido-2-methylpropanesulphonic acid, 2-acrylamidobutanesulphonic acid, 3-acrylamido-3-methylbutanesulphonic acid or 2-acrylamido-2,4,4-trimethylpentanesulphonic acid or vinylphosphonic acid. The copolymer can, moreover, also comprise at least one cationic monomer (b3) having ammonium groups, where the cationic monomer is salts of 3-trimethylammonium propyl(meth)acrylamides and 2-trimethylammonium ethyl (meth)acrylates.

The aforementioned hydrophilic monomers can of course be used not only in the depicted acid or base form, but also in the form of corresponding salts. It is also possible to convert acidic or basic groups to corresponding salts after the formation of the polymer.

As already explained, in one preferred embodiment of the invention, the copolymer according to the invention comprises at least one monomer (b) comprising acidic groups. These are preferably monomers which comprise at least one group selected from the group of —COOH, —$SO_3H$ or —$PO_3H_2$, particular preference being given to monomers comprising COOH groups and/or —$SO_3H$ groups. It also being possible for the acidic groups to be present partially or completely in the form of the corresponding salts.

Preferably, at least one of the monomers (b) is a monomer selected from the group of (meth)acrylic acid, vinylsulphonic acid, allylsulphonic acid or 2-acrylamido-2-methylpropanesulphonic acid (AMPS), particularly preferably acrylic acid and/or AMPS or salts thereof.

Overall, the monomer component (a) should be present in the polymer in amounts of from 0.1 to 20.0% by weight, preferably from 0.1 to 5% by weight, the monomer component (b) should be present in amounts of from 25.0 to 99.9% by weight and the component (c) should be present in amounts of from 0.1 to 5.0% by weight, in each case based on the total amount of all of the components in the copolymer. The precise amount is governed by the type and the desired intended use of the hydrophobically associating copolymers and is established accordingly by the person skilled in the art.

In general, it is regarded as preferred if the copolymer is a copolymer (A1) which comprises at least two different hydrophilic monomers (b), and these are at least one neutral hydrophilic monomer (b1), preferably acrylamide, and at least one hydrophilic anionic monomer (b2) which comprises at least one acidic group selected from the group of —COOH, —SO$_3$H or —PO$_3$H$_2$, where the amount of the monomers (a) is 0.1 to 12% by weight and that of all of the monomers (b) together is 70 to 99.5% by weight, with regard to the amount of all of the monomers in the copolymer.

Furthermore, a copolymer is to be regarded as preferred if it is a copolymer (A2) which comprises at least two different hydrophilic monomers (b), and these are at least 5 to 50% by weight of at least one neutral hydrophilic monomer (b1), and 25 to 94.9% by weight of at least one anionic monomer (b2) comprising sulphonic acid groups, where the amount of the monomers (a) is 0.1 to 12% by weight, and that of all of the monomers (b) together is 70 to 99.9% by weight, with regard to the amount of all of the monomers in the copolymer.

Component (c)

The copolymers according to the invention are obligatorily prepared in the presence of at least one nonpolymerizable, surface-active compound which is preferably at least one nonionic surfactant. However, anionic and cationic surfactants are also suitable provided they do not participate in the polymerization reaction.

The nonionic surfactant is preferably an ethoxylated long-chain, aliphatic alcohol which can optionally comprise aromatic fractions.

By way of example, mention may be made of: $C_{12}C_{14}$-fatty alcohol ethoxylates, $C_{16}C_{18}$-fatty alcohol ethoxylates, $C_{13}$-oxo alcohol ethoxylates, $C_{10}$-oxo alcohol ethoxylates, $C_{13}C_{15}$-oxo alcohol ethoxylates, $C_{10}$-Guerbet alcohol ethoxylates and alkylphenol ethoxylates.

A suitable surfactant is in particular at least one representative which is selected from the series of ethoxylated alkylphenols, the ethoxylated, saturated iso-C13-alcohols and/or the ethoxylated C10-Guerbet alcohols.

Monomers (d)

In special cases, besides the monomers (a) and (b), the copolymers according to the invention can optionally also comprise monomers (d) which have two or more, preferably two, ethylenically unsaturated groups. As a result of this, a certain crosslinking of the copolymer can be achieved provided that this has no undesired negative effects in the intended use of the copolymer. An excessively high degree of crosslinking, however, should in any case be avoided; in particular, the required solubility in water of the copolymer must not be impaired. Although slight crosslinking may be useful in individual cases, it is governed by the particular application of the copolymer, and the person skilled in the art makes a suitable selection.

Examples of suitable monomers (d) include 1,4-butanediol di(meth)acrylate, 1,6-hexanediol di(meth)acrylate, 1,3-butylene glycol di(meth)acrylate, neopentyl glycol di(meth)acrylate, ethylene glycol di(meth)acrylate, diethylene glycol di(meth)acrylate, triethylene glycol di(meth)acrylate or oligoethylene glycol di(meth)acrylates such as, for example, polyethylene glycol bis(meth)acrylate, N,N'-methylenebis (meth)acrylamide, ethylene glycol divinyl ether, triethylene glycol divinyl ether, triallylamine, triallylamine methammonium chloride, tetraallylammonium chloride or tris(2-hydroxy)isocyanurate tri(meth)acrylate.

The monomer (d) is particularly preferably selected from the group of triallylamine, triallylmethylammonium chloride, tetraallylammonium chloride, N,N'-methylenebisacrylamide, triethylene glycol bismethacrylate, triethylene glycol bisacrylate, polyethylene glycol(400) bismethacrylate and polyethylene glycol(400) bisacrylate.

If present at all, crosslinking monomers (d), however, are only used in small amounts. Generally, the amount of the monomers (d) should not exceed 1% by weight with regard to the amount of all of the monomers used. Preferably, not more than 0.5% by weight and particularly preferably not more than 0.1% by weight should be used. Type and amount of the crosslinker are established by the person skilled in the art depending on the desired application of the copolymer.

Preparation of the Water-Soluble, Hydrophobically Associating Copolymers

The copolymers according to the invention can be prepared by methods known in principle to the person skilled in the art by free-radical polymerization of the monomers (a), (b) and optionally (d), for example by solution polymerization or gel polymerization in aqueous phase, although each of the possible polymerization variants must obligatorily be carried out in the presence of at least one component (c).

The synthesis of the monomers (a) of the formula (I) used according to the invention are particularly preferably prepared according to the preparation process described above by alkoxylation of alcohols (III) optionally followed by an etherification.

In one preferred embodiment, the preparation is carried out by means of gel polymerization in aqueous phase. For the gel polymerization, firstly a mixture of the monomers (a), (b) and optionally (d), initiators, the surfactant (c) and other auxiliaries is prepared with water. Acidic monomers can be completely or partially neutralized before the polymerization. Preference is given to a pH of ca. 4 to ca. 9. The concentration of all of the components with the exception of the solvents is usually ca. 20 to 60% by weight, preferably ca. 30 to 50% by weight.

It is recommended to subject at least one hydrophobically associating monomer (a) and at least one hydrophilic monomer (b) to an aqueous solution polymerization in the presence of at least one surface-active component (c), where preferably the monomer component (a) is initially introduced and then, in succession, the monomer component (b) and the component (c) are added. Moreover, a mixture comprising the monomer component (b) and the component (c) can optionally be added to the monomer component (a). However, also contemplated by the invention is that the component (c) is added to the monomer component (a) and then the monomer component (b) is added to the resulting mixture. The polymerization should be carried out in particular at a pH in the range from 5.0 to 7.5 and preferably at a pH of 6.0.

One aspect that is decisive and thus essential to the invention is the addition of the surfactant (c) to the reaction solution prior to the initiation of the polymerization, where the order in which the monomers a) and b) and also component c) are added can—as described above—to a large extent be freely chosen.

The mixture is then polymerized photochemically and/or thermally, preferably at −5° C. to 50° C. If thermal polymerization is carried out, preference is given to using polymerization initiators which start even at a comparatively low temperature, such as, for example, redox initiators. The thermal polymerization can be carried out even at room temperature or by heating the mixture, preferably to temperatures of not more than 50° C. The photochemical polymerization is usually carried out at temperatures of from −5 to 10° C. Photochemical and thermal polymerization can particularly advantageously be combined with one another by adding to the mixture both initiators for the thermal and also for the photochemical polymerization. The polymerization is started in this case initially by photochemical means at low temperatures, preferably −5 to +10° C. As a result of the heat of reaction which is liberated, the mixture heats up and as a result of this the thermal polymerization is additionally started. By means of this combination it is possible to achieve a conversion of more than 99%.

The gel polymerization generally takes place without stirring. It can take place batchwise by irradiating and/or heating the mixture in a suitable vessel at a layer thickness of from 2 to 20 cm. The polymerization produces a solid gel. The polymerization can also be carried out continuously. For this, a polymerization apparatus is used which has a conveyor belt for receiving the mixture to be polymerized. The conveyor belt is equipped with devices for heating or for irradiating with UV radiation. Here, the mixture is poured using a suitable device at one end of the belt, the mixture is polymerized in the course of transportation in the direction of the belt and the solid gel can be removed at the other end of the belt.

After the polymerization, the resulting gel is preferably comminuted and dried. The drying should preferably take place at temperatures below 100° C. To avoid sticking together, a suitable separating agent can be used for this step. This gives the hydrophobically associating copolymer in the form of granules or powder.

Further details on carrying out a gel polymerization are disclosed, for example, in DE 10 2004 032 304 A1, sections [0037] to [0041].

The copolymers according to the invention preferably have a number-average molecular weight $M_n$ of from 50 000 to 25 000 000 g/mol.

Since the resulting polymer powder or granules are generally used in the form of an aqueous solution in the course of the application at the site of use, the polymer has to be dissolved in water on site. This may lead to undesired clumping with the described high molecular weight polymers. In order to avoid this, an auxiliary which accelerates and/or improves the dissolution of the dried polymer in water can be added to the polymers according to the invention during the synthesis. This auxiliary may be, for example, urea.

Use of the Water-Soluble, Hydrophobically Associating Copolymers

The hydrophobically associating copolymers according to the invention can be used for the thickening of aqueous phases.

Selection of the type and amount of the monomers (a) and (b) and optionally (c) and/or (d) allows the properties of the copolymers to be adapted to the particular technical requirements.

The use concentration is established by the person skilled in the art depending on the type of aqueous phase to be thickened and also on the type of copolymer. As a rule, the concentration of the copolymer is 0.05 to 5% by weight, with regard to the aqueous phase, preferably 0.1 to 2% by weight and particularly preferably 0.15 to 1% by weight.

The copolymers can be used here on their own or in combination with other thickening components, for example other thickening polymers. Furthermore, they can be formulated for example together with surfactants to give a thickening system. In aqueous solution, the surfactants can form micelles and, together with the micelles, the hydrophobically associating copolymers can form a three-dimensional, thickening network.

For use, the copolymer can be dissolved directly in the aqueous phase to be thickened. It is also conceivable to pre-dissolve the copolymer and then to add the formed solution to the system to be thickened.

The aqueous phases to be thickened may be preferably construction chemistry systems such as, for example, construction systems based on hydraulic binders such as cement, lime, gypsum and anhydrite, and water-based paint and coating systems, formulations for the recovery of mineral oil, such as, for example, drilling fluids, formulations for the acidizing or fracturing, or formulations for enhanced oil recovery.

In this connection, the present invention envisages as a preferred use of the copolymers their use as thickening, rheological additive for water-based systems, preferably for solutions, and in particular in the development, exploitation and completion of subterranean mineral oil deposits and natural gas deposits. If the copolymer according to the invention is used for enhanced oil recovery, an aqueous formulation of said copolymers in a concentration of from 0.01 to 1% by weight is preferably injected into a mineral oil deposit through at least one injection well and crude oil is removed from the deposit through at least one production well.

According to the invention, however, the copolymer can also be used as a rheological additive for aqueous construction systems which comprise hydraulic binder systems, in which case the copolymer should then preferably be in the form of granules or powder.

The aqueous phases to be thickened may, however, also be, for example, liquid detergent and cleaner formulations, such as, for example, detergents, washing auxiliaries such as, for example, pre-spotters, fabric softeners, cosmetic formulations, pharmaceutical formulations, foods, coating slips, formulations for textile production, textile printing pastes, printing inks, printing pastes for textile printing, paints, pigment slurries, aqueous formulations for generating foam, deicing mixtures, for example for aircraft, and generally formulations for the construction industry.

The following examples are intended to illustrate the invention in more detail:

EXAMPLES

1. Preparation Process

1.1 Preparation Example 1

(Comparison): without the Addition of Surfactant During the Polymerization 242.5 g of a 50% Na AMPS solution (AMPS 2405, Lubrizol) were initially introduced into a 3 l vessel fitted with stirrer and thermometer. 295.8 g of water were added with stirring. Then, in succession, 1.2 g of Surfynol DF 58 and 0.4 g of Baysilone EN (Bayer) were added as antifoams. After adding 4.6 g of Pluriol A1190V+12PeO (developmental product from BASF consisting of hydroxybutyl vinyl ether with 25 ethylene oxide units and 12 pentene oxide units), 228.8 g of a 50% strength acrylamide solution (Cytec) were added. After adding 2.4 g of a 5% strength Versenex solution to destabilize the acrylamide solution, the pH was adjusted to 6.0 using a 20% NaOH solution and/or 20% strength $H_2SO_4$ solution. During the inertization by flushing for 30 minutes with nitrogen, the solution was cooled to approx. 20° C. The solution was then transferred to a plastic container with the dimensions (w*d*h) 15 cm*10 cm*20 cm and, in succession, 16.0 g (200 ppm) of 10% strength 2,2'-azobis(2-amidinopropane) dihydrochloride, 0.5 g (10 ppm) of 1% strength bisulphite solution, 8 g (6 ppm) of 0.1% strength tert-butyl hydroperoxide solution and 4.0 g (5 ppm) of 1% strength iron(II) sulphate solution were added.

The polymerization was started by irradiating with UV light (two Philips tubes; Cleo performance 40 W). After ca. 2-3 h, the cut-resistant gel was removed from the plastic container and cut into gel cubes measuring ca. 5 cm*5 cm*5 cm using scissors. Before the gel cubes were comminuted using a conventional meat grinder, they were coated with the separating agent Sitren 595 (polydimethylsiloxane emulsion; Goldschmidt). The separating agent is a polydimethylsiloxane emulsion, which was diluted 1:20 with water.

The resulting gel granules were then spread evenly on a drying mesh and dried to constant weight in a convection drying oven at ca. 90-120° C. in vacuo. Ca. 500 g of white, hard granules were obtained which were converted to a pulverulent state with the help of a centrifugal mill.

1.2 Preparation Examples 2-4

(According to the Invention): with the Addition of Surfactant During the Gel Polymerization In addition to the monomer solution as described in Comparative Example 2, as surfactant, Lutensol TO 15 (BASF, C13-oxo alcohol ethoxylate+15 ethylene oxide units) was dissolved in the following amounts in the monomer solution prior to the polymerization:

Preparation Example 2: 1% Lutensol TO 15 corresponds to 2.4 g
Preparation Example 3: 2% Lutensol TO 15 corresponds to 4.8 g
Preparation Example 4: 3% Lutensol TO 15 corresponds to 7.2 g

1.3 Preparation Examples 5-10

According to the Invention

Starting from Preparation Example 3, the following polymers were prepared with alternative surfactants to Lutensol TO 15 (measurement of the viscosity as described in Application Example 1):

| | Surfactant | Viscosity [mPas] |
|---|---|---|
| Preparation Ex. 3 | 2% Lutensol TO 15 (C13-oxo alcohol ethoxylate + 15 EO) | 230 |
| Preparation Ex. 5 | 2% Lutensol AP 10 (alkylphenol + 10 EO) | 390 |
| Preparation Ex. 6 | 2% Lutensol XL100 (C10-Guerbet alcohol + 10 EO) | 140 |
| Preparation Ex. 7 | 2% Lutensol XP100 (C10-Guerbet alcohol + 10 EO) | 80 |
| Preparation Ex. 8 | 2% Sodium dodecylsulphonate (SDS) | 100 |
| Preparation Ex. 9 | 2% Dodecyltrimethylammonium chloride | 150 |
| Preparation Ex. 10 | 2% Lutensol TO 10 (C13-oxo alcohol ethoxyiate + 10 EO) | 270 |

As can be seen from the data, it is possible to use not only Lutensol TO 15 but also other nonionic surfactants, and also anionic and cationic surfactants in the synthesis of the copolymers according to the invention.

1.4 Preparation Example 11

According to the Invention

Analogously to Preparation Example 3, a copolymer was prepared with an alternative water-soluble, hydrophobically associating monomer to Pluriol A1190V+12PeO. This monomer consists of a C12-alcohol ethoxylated with 7 EO which has then been reacted with methacrylic anhydride (Genagen LA070MA from Clariant). The mass of the Genagen used corresponds to that of the Pluriol A1190V+12PeO in Preparation Example 3.

Measurement of the viscosity as described in Application Example 1 gave a value of 780 mPas.

This preparation example shows that different water-soluble, hydrophobically associating monomers can be used.

1.5 Preparation Example 12

According to the Invention

Analogously to Preparation Example 3, a mixed ionic copolymer was prepared. This copolymer comprises, in addition to AMPS, acrylamide and Pluriol A1190V+12PeO, the cationic monomer 3-trimethylammonium propylmethacrylamide chloride (DIMAPAQUAT). The molar ratio of the monomers is AMPS:acrylamide:DIMAPAQUAT:Pluriol A1190V+12PeO=30:37:32:1.

Measurement of the viscosity, as described in Application Example 1, gave a value of 56 mPas.

1.6 Preparation Example 13

According to the Invention

Analogously to Preparation Example 3, a copolymer was prepared which comprises, instead of 4.6 g of Pluriol A1190V+12PeO, the same molar amount of Pluriol A1190V+16PeO (developmental product from BASF consisting of hydroxybutyl vinyl ether with 25 ethylene oxide units and 16 pentene oxide units).

Measurement of the viscosity, as described in Application Example 1, gave a value of 77 mPas.

1.7 Preparation Example 14

According to the Invention

Analogously to Preparation Example 3, a copolymer was prepared which comprises the sodium salt of acrylic acid instead of Na AMPS. The mass % of the monomers have been 82% Na-acrylate, 70% acrylaminde and 2% Pluriol A1190V+12PeO, 4.8 g Lutensol AP 10 (BASF) have been added as surfactant in the solid content of the polymerized gels have been 19.5%.

Measurement of the viscosity, as described in Application Example 1, gave a value of 49 mPas.

1.8 Preparation Example 15

According to the Invention

Analogously to Preparation Example 3, a copolymer was prepared in which the Na AMPS has been replaced partially by the sodium salt of acrylic acid. The mass % of the monomers have been 28% AMPS, 20% Na-acrylate, 50% acrylamide and 2% Pluriol A1190V+12PeO, 4.8 g Lutensol TO 15 (BASF) have been added as surfactant. Measurement of the viscosity, as described in Application Example 1, gave a value of 40 mPas.

1.9 Preparation Example 16

According to the Invention

This example represents a polymerization procedure alternatively to the preparation example 5. 121.2 g Na-AMPS (50% solution) have been provided in a plastic bucket containing a magnetic steerer, a pH-meter and a thermometer and than 155 g distilled water, 0.6 g Surfynol, 0.2 g Bisylone, 2.3 g Pluriol A1190V+12PeO, 114.4 g acrylamide (50% solution), 1.2 g Versenex (5% solution) and 2.4 g Lutensol AP10 have been added successively.

After adjustion of the pH 6 by using a 20% and 2%, respectively, sulfonic acid solution and the addition of water (whole water amount minus the amount of added water, minus the amount of used acid) the monomer solution has been brought to the starting temperature of 20° C. Then, the solution has been transferred to a thermos flask, a thermo sensor for documenting the temperature has been installed and the solution has been bubbled with nitrogen for 30 minutes. At the end of the nitrogen addition the temperature online measure has been started, the starting temperature has been controlled and if necessary readjusted and than 1.6 ml of a 10% V50-solution, 0.12 ml of a 1% t-BHo-solution and 0.24 ml of a 1% sodium sulphite solution have been added. When the monomer solution started thickening the nitrogen frit has been removed from the monomer solution. After the temperature of the gelblocks have reached its maximum the thermo sensor has been removed and the thermos flask has been placed in a drying chamber for 2 hours at 80° C.

After that the gelblock has been removed from the thermos flask and the surface has been cut off with a depth of 0.5 to 1 cm by using scissors and the cut off has been dropped. The left overs of the gelblock has been halfed and Comperlan COD (coconat oil acid diethanolamide) has been applied as release agent; then the gelblocks have been crushed by using a meat chopper.

The such manufactured gel granulate has been dried at 55° C. for 2 hours in a fluid bed dryer. The resulting white coloured firm granulate finally has been transferred to a powder by using a centrifugal mill.

1.10 Preparation Example 17

According to the Invention

The preparation has been analogously to Preparation Example 1.9 but by using 6 g Pluriol A1190V+12PeO and 6 g Lutensol AP 10.

2. Application Examples

2.1

The polymers of Preparation Examples 1-4 were dissolved in synthetic seawater in accordance with DIN 50900 (salt content 35 g/l) so that a polymer concentration of 4000 ppm was reached. The viscosity of these solutions was measured using a Haake rheometer with a double-gap geometry at 7 s$^{-1}$ and 60° C.

| Polymer | Viscosity [mPa * s] |
| --- | --- |
| Preparation Example 1 | 24 |
| Preparation Example 2 | 360 |
| Preparation Example 3 | 230 |
| Preparation Example 4 | 80 |

It is clearly seen that by adding Lutensol TO 15 during the polymerization it is possible to significantly increase the viscosity of the polymers. Furthermore, the added amount of surfactant has a marked influence on the viscosity.

2.2

In order to show that the polymers according to the invention are not only a physical mixture of the polymer from Preparation Example 1 and the surfactant, but that the polymer structure is decisively influenced during the polymerization reaction, the viscosities of mixtures of the polymer from Preparation Example 1 with the surfactant Lutensol TO 15 were also measured:

| | Viscosity [mPas] | Viscosity of the mixture of Preparation Example 1 with the corresponding amount of Lutensol TO 15 [mPas] |
| --- | --- | --- |
| Preparation Example 2 | 360 | 25 |
| Preparation Example 3 | 230 | 26 |
| Preparation Example 4 | 80 | 20 |

As can be seen from these measurements, a subsequent addition of the surfactant does not have a positive influence on the viscosity of the polymer.

For more detailed investigation of the action mechanism, the polymer from Preparation Example 3 was refluxed with toluene in the Soxhlet over a period of 48 h.

Here, 90% of the Lutensol TO 15 originally present was extracted from the copolymer. However, the high viscosity of the polymer was retained even after virtually complete extraction of the surfactant.

This indicates that the surfactant is not incorporated and/or grafted covalently into the copolymer, but that the addition of surfactant has a positive influence on the synthesis of the polymer structure. This could be pictured such that the surfactant forms mixed micelles with the hydrophobically associating monomer.

2.3

1 g of the respective copolymer from Preparation Examples 1-4 was stirred in 249 g of synthetic seawater in accordance with DIN 50900 (salt content 35 g/l) for 24 h until completely dissolved. The solution was then filtered over a sieve with a mesh width of 200 μm and the volume of the residue remaining on the sieve was measured. The value obtained corresponds to the gel fraction.

| Polymer | Gel fraction [ml] |
|---|---|
| Preparation Example 1 (comparison) | 45 |
| Preparation Example 2 (invention) | 9 |
| Preparation Example 3 (invention) | 5 |
| Preparation Example 4 (invention) | <1 |

As can be seen from the data, the gel fraction is significantly reduced as a result of adding the surfactant. With increasing amount of surfactant, the gel fraction can be reduced to below the detection limit.

The invention claimed is:

1. A copolymer comprising
   (a) at least one monoethylenically unsaturated, water-soluble, surface-active monomer (a), and
   (b) at least one monoethylenically unsaturated, hydrophilic monomer (b) different from monomer (a),
   wherein the monomer (a) is at least one compound selected from the group consisting of formulae (I), (II) or (III)

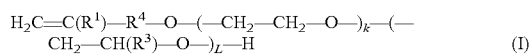

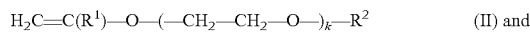

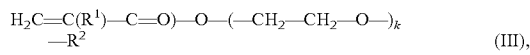

wherein the units $-(-CH_2-CH_2-O-)_k$ and $-(-CH_2-CH(R^3)-O-)_l$ are arranged in block structure in the order shown in formula (I) and the radicals and indices are defined as follows:
   k is a number from 6 to 150,
   L is a number from 5 to 25,
   $R^1$ is H or methyl,
   $R^2$ is a hydrocarbon radical having 8 to 40 carbon atoms, wherein the hydrocarbon radical is at least one member selected from the group consisting of aliphatic, aromatic, straight-chain and branched,
   $R^3$ is independently of one another, a hydrocarbon radical having at least 2 carbon atoms,
   $R^4$ is a single bond or a divalent linking group selected from the group of $-(C_nH_{2n})-$, $-O-(C_{n'}H_{2n'})-$ and $-C(O)-O-(C_{n''}H_{2n''})-$ where n, n' and n" is in each case a natural number from 1 to 6, and
   wherein during its synthesis, prior to the initiation of the polymerization reaction, at least one further, but non-polymerizable surface-active compound has been used as further component (c), and wherein the copolymer is a water-soluble, hydrophobically associating copolymer.

2. A copolymer according to claim 1, wherein component (c) comprises a non-ionic surfactant that is a $C_{12}$-$C_{14}$-fatty alcohol ethoxylate.

3. A copolymer according to claim 1, wherein the monomer component (a) is present in an amount of from 0.1 to 20.0% by weight, the monomer component (b) is present in an amount of from 25.0 to 99.9% by weight and the component (c) is present in an amount of from 0.1 to 5.0% by weight, each based on the total amount of all components in the copolymer.

4. A copolymer according to claim 1, wherein $R^3$ is a hydrocarbon radical having at least 3 carbon atoms.

5. A copolymer according to claim 1, wherein $R^1$ is H and $R^4$ is selected from the group consisting of $-CH_2-$ or $-O-CH^2-CH^2-CH^2-CH^2-$.

6. A copolymer according to claim 1, wherein at least one of the monomers (b) is a monomer comprising at least one member selected from the group consisting of an acidic group and a salt of an acidic group.

7. A copolymer according to claim 6, wherein the acidic group is selected from the group consisting of $-COOH$, $-SO_3H$ and $-PO_3H_2$ and wherein the salt of the acidic group is a salt of a member selected from the group consisting of $-COOH$, $-SO_3H$ and $-PO_3H_2$.

8. A copolymer according to claim 1, wherein it is a copolymer (A1) which comprises at least two different hydrophilic monomers (b) selected from the group consisting of
   one neutral hydrophilic monomer (b1) and
   at least one hydrophilic anionic monomer (b2) which comprises at least one acidic group selected from the group of $-COOH$, $-SO_3H$, $-PO_3H_2$, and salts thereof,
   where the amount of the monomers (a) is 0.1 to 5% by weight and that of all of the monomers (b) together is 70 to 99.5% by weight, with regard to the amount of all of the monomers in the copolymer.

9. A copolymer according to claim 8, wherein the neutral monomer (b1) is a monomer selected from the group consisting of (meth)acrylamide, N-methyl(meth)acrylamide, N,N-dimethyl(meth)acrylamide, N-methylol(meth)acrylamide, N-vinylformamide or N-vinyl-2-pyrrolidone, and the monomer (b2) is at least one member selected from the group consisting of
   (meth)acrylic acid,
   vinylsulphonic acid,
   allylsulphonic acid,
   2-acrylamido-2-methylpropanesulphonic acid,
   2-methacrylamido-2-methylpropanesulphonic acid,
   2-acrylamidobutanesulphonic acid,
   3-acrylamido-3-methylbutanesulphonic acid,
   2-acrylamido-2,4,4-trimethylpentanesulphonic acid and
   vinylphosphonic acid.

10. A copolymer according to claim 8, wherein the copolymer further comprises at least one cationic monomer (b3) having ammonium groups.

11. A copolymer according to claim 10, wherein the cationic monomer is a salt of
    3-trimethylammonium propyl(meth)acrylamide or
    2-trimethylammonium ethyl(meth)acrylate.

12. A copolymer according to claim 1, that is a copolymer (A2) which comprises at least two different hydrophilic monomers (b), and these are at least
    one neutral hydrophilic monomer (b1), and
    at least one cationic monomer (b3),
    where the amount of the monomers (a) is 0.1 to 12% by weight and that of all of the monomers (b) together is 70 to 99.9% by weight, with regard to the amount of all of the monomers in the copolymer.

13. A copolymer according to claim 1, wherein it is a copolymer (A2) which comprises at least two different hydrophilic monomers (b), and these are at least
    5 to 50% by weight of at least one neutral hydrophilic monomer (b1), and
    25 to 94.9% by weight of at least one anionic monomer (b2) comprising sulphonic acid groups
    where the amount of the monomers (a) is 0.1 to 12% by weight, and that of all of the monomers (b) together is 70 to 99.9% by weight, with regard to the amount of all of the monomers in the copolymer.

14. A copolymer according to claim 1, wherein the copolymer also comprises up to 1% by weight of a crosslinking monomer (d) comprising at least two ethylenically unsaturated groups, where monomer (d) is at least one selected from the group of triallylamine, triallylmethylammonium chloride, tetraallylammonium chloride, N,N'-methylenebisacrylamide, triethylene glycol bismethacrylate, triethylene glycol bisacrylate, polyethylene glycol(400) bismethacrylate and polyethylene glycol(400) bisacrylate.

15. A process for the preparation of the copolymer according to claim 1, wherein at least one hydrophobically associating monomer (a) and at least one hydrophilic monomer (b) are subjected to an aqueous solution polymerization in the presence of at least one surface-active component (c).

16. A process according to claim 15, wherein the monomer component (a) is initially introduced and then the monomer component (b) and the component (c) are added in succession.

17. A process according to claim 15, wherein a mixture comprising the monomer component (b) and the component (c) is added to the monomer component (a).

18. A process according to claim 15, wherein the component (c) is added to the monomer component (a) and then the monomer component (b) is added to the resulting mixture.

19. A process according to claim 15, wherein the polymerization is carried out at a pH in the range from 5.0 to 7.5.

20. A process according to claim 15, wherein the polymerization is started under the effect of light in the wavelength range from 100 to 400 nm.

21. A process according to claim 15, wherein the resulting polymerization product, preferably in the form of a gel is comminuted and finally dried.

22. A copolymer according to claim 8, wherein the monomer (b2) is 2-acrylamido-2-methylpropane-sulfonic acid (AMPS).

23. A copolymer according to claim 1, wherein component (c) comprises a C13-oxo alcohol ethoxylate with 15 ethylene oxide units.

24. A copolymer according to claim 8, wherein the neutral hydrophilic monomer (b1) is acrylamide.

25. A copolymer according to claim 1, wherein monomer (a) comprises a hydroxybutyl vinyl ether with 25 ethylene oxide units and 12 pentene oxide units.

* * * * *